(12) United States Patent
Yee et al.

(10) Patent No.: US 10,726,424 B1
(45) Date of Patent: Jul. 28, 2020

(54) COMPUTER-BASED SYSTEMS AND PLATFORMS AND COMPUTER-IMPLEMENTED METHODS CONFIGURED FOR ONE OR MORE TECHNOLOGICAL APPLICATIONS INVOLVING REDUCTION OF FALSE-POSITIVE FRAUD DETECTION INCIDENTS

(71) Applicant: Capital One Services, LLC, McLean, VA (US)

(72) Inventors: Bryant Yee, Washington, DC (US); George Bergeron, Falls Church, VA (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/525,242

(22) Filed: Jul. 29, 2019

(51) Int. Cl.
*G06Q 40/00* (2012.01)
*G06Q 20/40* (2012.01)
*G06Q 20/32* (2012.01)
*G06Q 20/42* (2012.01)
*H04L 29/08* (2006.01)
*H04W 4/14* (2009.01)
*G06K 9/78* (2006.01)

(52) U.S. Cl.
CPC .......... *G06Q 20/4016* (2013.01); *G06K 9/78* (2013.01); *G06Q 20/3255* (2013.01); *G06Q 20/425* (2013.01); *H04L 67/02* (2013.01); *H04L 67/26* (2013.01); *H04W 4/14* (2013.01); *H04L 67/10* (2013.01)

(58) Field of Classification Search
CPC .................................................. G06Q 20/4016
USPC ............................................ 705/1.1, 35, 41
See application file for complete search history.

(56) References Cited

U.S. PATENT DOCUMENTS

| 8,447,674 | B2* | 5/2013 | Choudhuri ......... G06Q 30/0185 705/35 |
| 9,497,216 | B2 | 11/2016 | Khanna et al. |
| 10,115,083 | B1* | 10/2018 | Koeppel ............. G06Q 20/327 |
| 2010/0274572 | A1* | 10/2010 | Hammad ............ G06Q 20/202 705/1.1 |
| 2013/0024358 | A1 | 1/2013 | Choudhuri et al. |
| 2015/0269560 | A1* | 9/2015 | Barrett ................ G06Q 20/342 705/41 |
| 2016/0350758 | A1* | 12/2016 | Zoldi ..................... G06Q 10/04 |
| 2018/0082286 | A1 | 3/2018 | DeLuca et al. |
| 2018/0285876 | A1* | 10/2018 | Vrtic ..................... G06Q 20/40 |
| 2019/0108363 | A1 | 4/2019 | Caldwell |

* cited by examiner

*Primary Examiner* — Samica L Norman
(74) *Attorney, Agent, or Firm* — Greenberg Traurig, LLP

(57) ABSTRACT

Systems and methods involving computer-based processing for proactively reducing false-positive fraud detection incidents are disclosed. In one embodiment, an exemplary computer-implemented method may comprise: detecting when a subject online transaction matches criteria indicating it is unusual; operating a browser extension application to obtain UI image data and purchase details of an item purchased by a user during the unusual online transaction; evaluating historical transactions of the user to identify a potentially fraudulent online transaction; and executing a false-positive detection routine to determine if the potentially fraudulent online transaction is valid.

22 Claims, 9 Drawing Sheets

US 10,726,424 B1

COMPUTER-BASED SYSTEMS AND PLATFORMS AND COMPUTER-IMPLEMENTED METHODS CONFIGURED FOR ONE OR MORE TECHNOLOGICAL APPLICATIONS INVOLVING REDUCTION OF FALSE-POSITIVE FRAUD DETECTION INCIDENTS

FIELD OF TECHNOLOGY

The present disclosure generally relates to improved computer-based platforms and systems and improved computer-implemented methods configured for one or more novel technological applications involving proactively reducing false-positive fraud detection incidents associated with online or other network-based transactions.

BACKGROUND OF TECHNOLOGY

A computer network platform/system may include a group of computers (e.g., clients, servers, smart routers, etc.) and other computing hardware devices that are linked together through one or more communication channels to facilitate communication, information or resource sharing and/or computer-implemented transactions, such as via one or more specifically programmed software applications, Web browsers and/or browser extensions consistent with the present disclosure, among a wide range of uses.

SUMMARY OF DESCRIBED SUBJECT MATTER

In some embodiments, the present disclosure provides various exemplary technically improved computer-implemented platforms, systems and methods, including methods for proactively reducing false-positive fraud detection incidents via features and functionality such as:

detecting, via a browser extension application, when a subject online transaction by a user matches at least one criteria specifying that the subject online transaction is defined as unusual;

operating the browser extension application, during the unusual subject online transaction and before completion thereof, to obtain UI image data including purchase details of an item purchased via the unusual subject online transaction;

evaluating a plurality of the user's historical transactions to identify a potentially fraudulent online transaction; and executing a false-positive detection routine for the potentially fraudulent online transaction, the detection routine comprising:

determining that the potentially fraudulent online transaction is the subject online transaction based on the UI image data; and issuing a push notification to the user's browser or mobile device, the push notification comprising: (i) a screenshot from the UI image data and (ii) a prompt or UI element enabling the user to confirm whether the potentially fraudulent online transaction is a valid online transaction.

In some embodiments, the present disclosure also provides exemplary technically improved, computer-implemented platforms, systems and computer-readable media, including aspects involving software applications such as Web browsers and browser extensions, whether resident on a device or provided for download via a server, that include or involves features, functionality, components and/or steps consistent with the disclosed technology.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
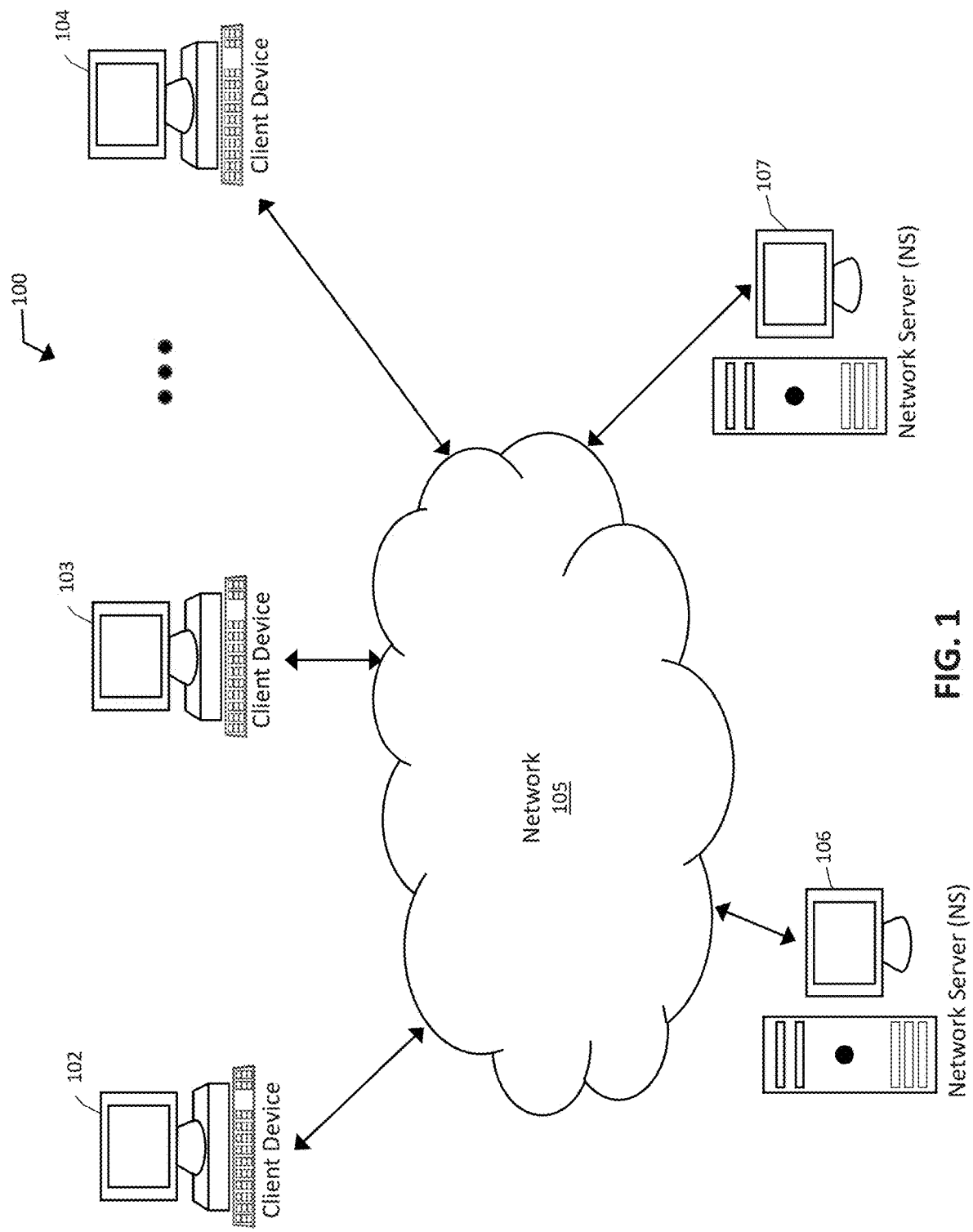
FIG. 1 is a block diagram depicting an exemplary computer-based system and platform, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 3-4) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

Figure 3:
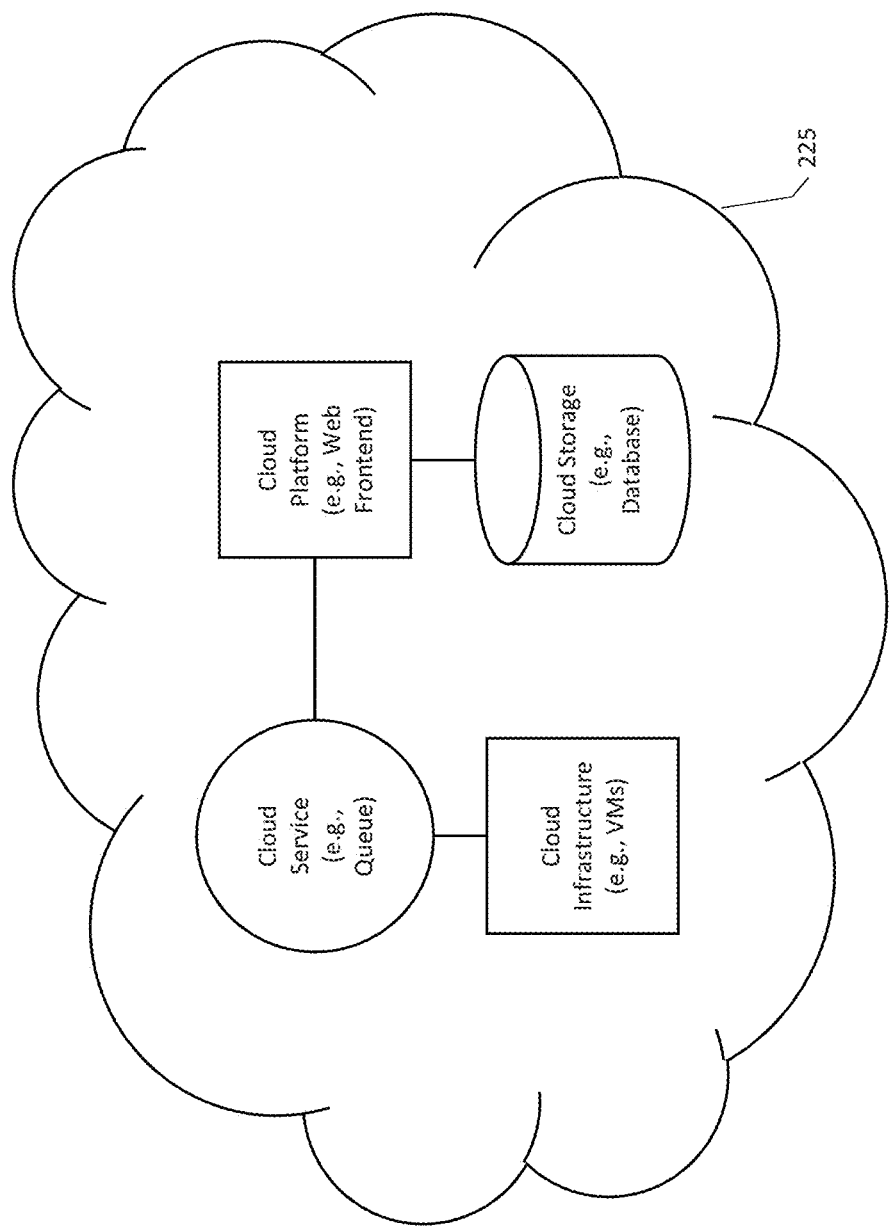
FIGS. 3 and 4 are diagrams illustrating two exemplary implementations of cloud computing architecture/aspects with respect to which the disclosed technology may be specifically configured to operate, in accordance with one or more embodiments of the present disclosure.
Figure 4:
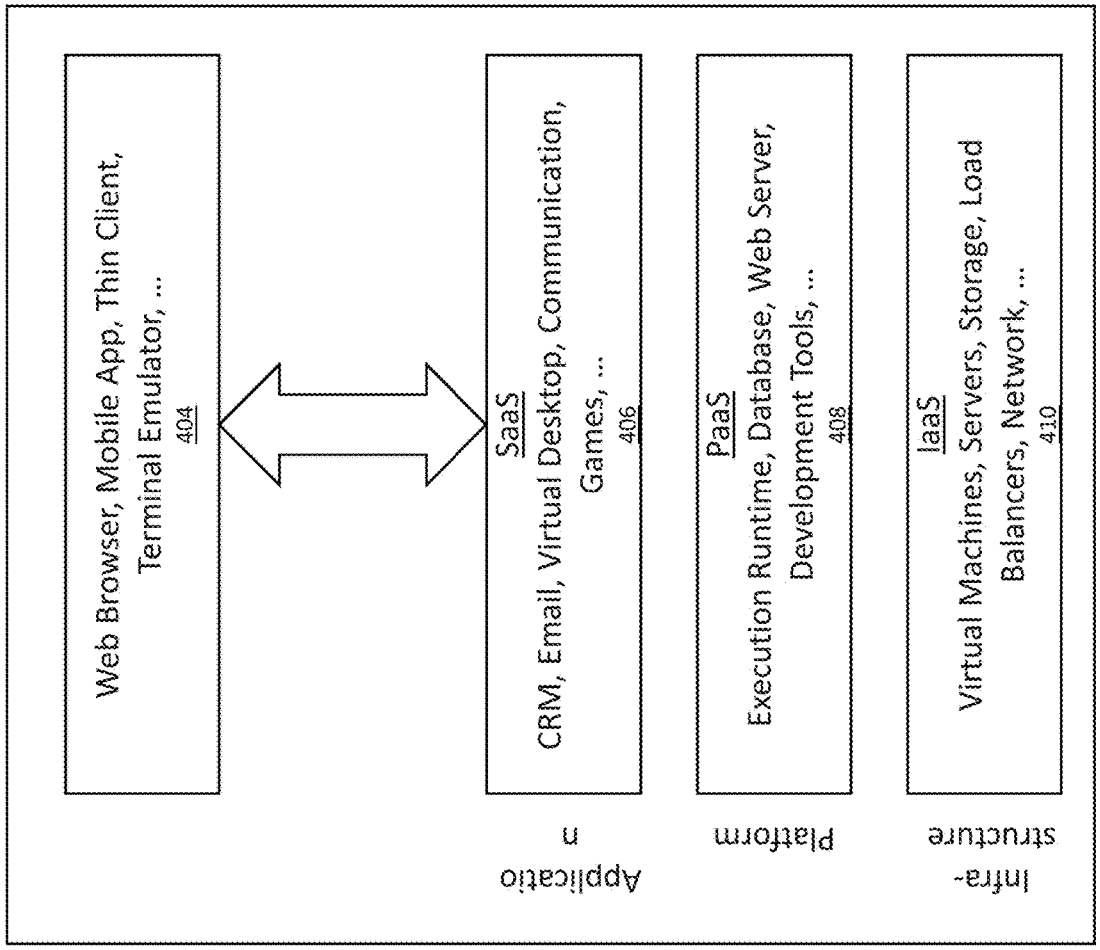

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). Examples of such cloud components are shown in FIGS. 3-4.

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 depicts a block diagram of an exemplary computer-based system/platform 100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members (e.g., clients, and their users) and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer- or machine-readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
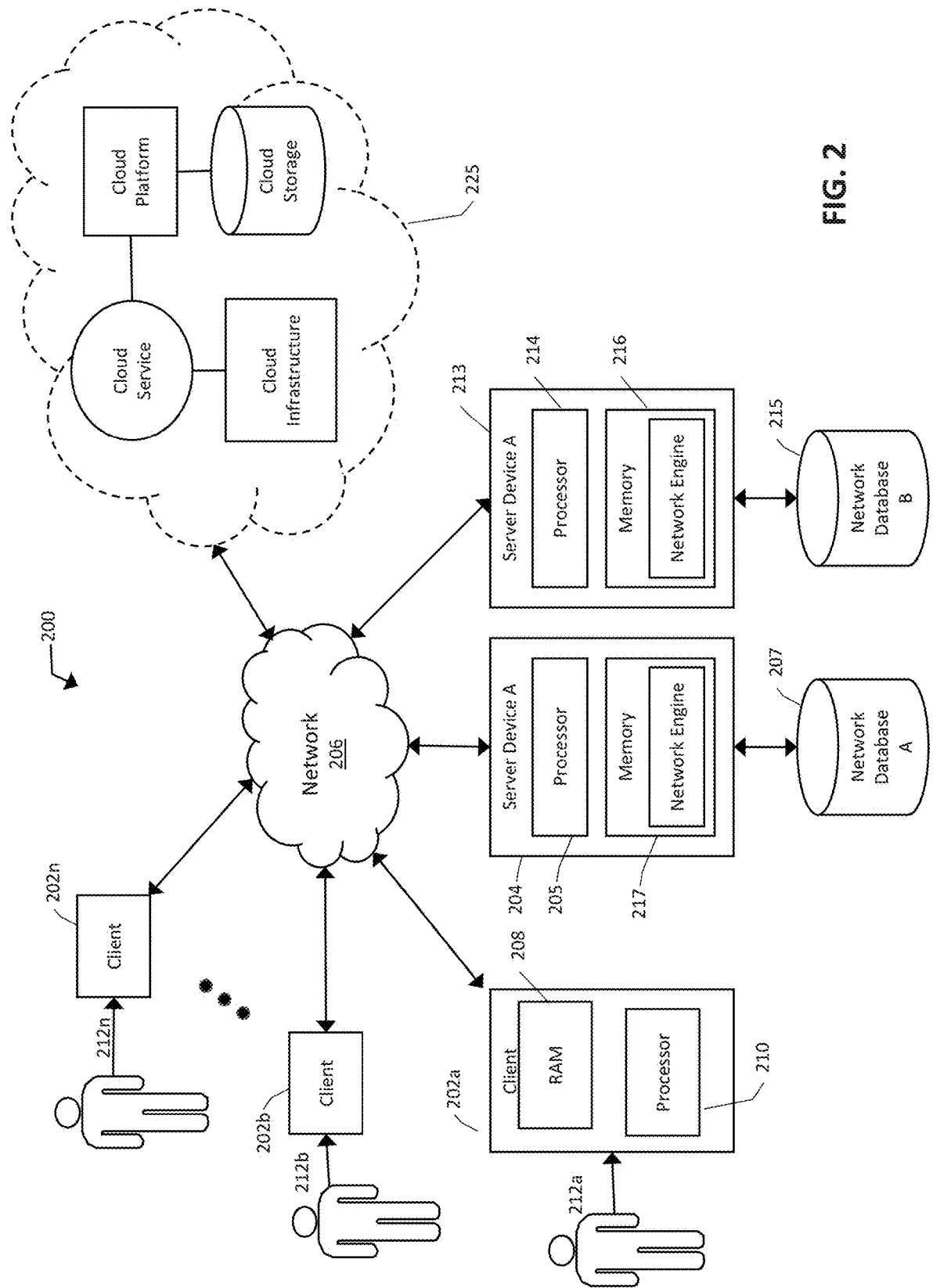
FIG. 2 is a block diagram depicting another exemplary computer-based system and platform, in accordance with one or more embodiments of the present disclosure.

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b thru 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a-n may also comprise a number of external or internal devices such as a mouse, a CD-ROM, DVD, a physical or virtual keyboard, a display, or other input or output devices. In some embodiments, examples of member computing devices 202a-n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a-n may be specifically programmed with one or more application programs in accordance with one or more principles/methodologies detailed herein. In some embodiments, member computing devices 202a-n may operate on any operating system capable of supporting a browser or browser-enabled application, such as Microsoft™, Windows™, and/or Linux. In some embodiments, member computing devices 202a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202a-n, users, 212a-n, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202a-n may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

As also shown in FIGS. 2 and 3, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 4, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 3 and 4 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 406, 408, 410 may be utilized in connection with the Web browser and browser extension aspects, shown at 404, to achieve the innovations herein.

Figure 5:
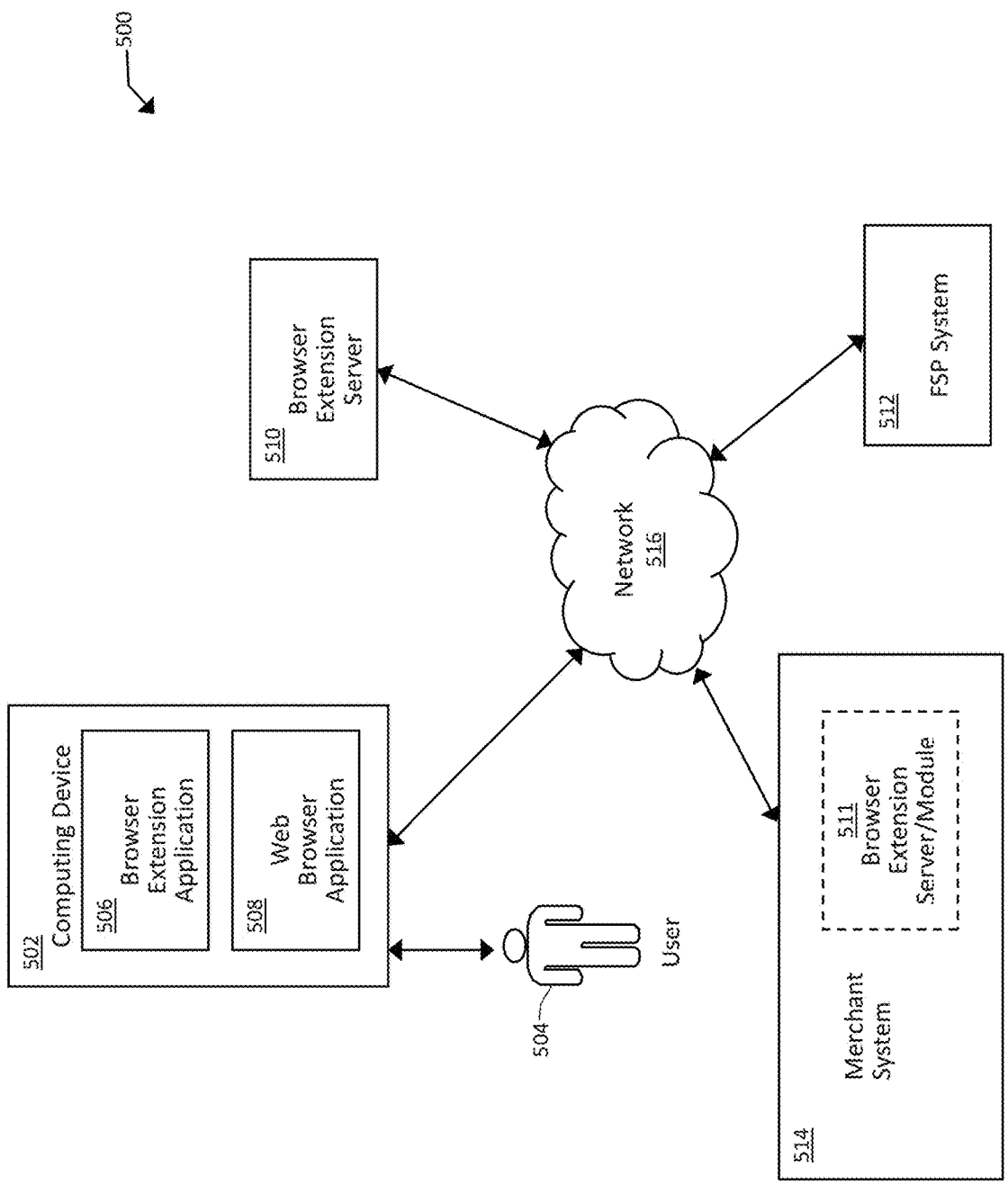
FIG. 5 is a block diagram of an exemplary system involving features of false-positive incident detection/prevention, consistent with exemplary aspects of at least some embodiments of the present disclosure.

FIG. 5 is a block diagram of an exemplary system 500, consistent with disclosed embodiments. System 500 may be configured for executing a software application having a browser extension process consistent with disclosed embodiments. As shown, system 500 may include a computing device 502 associated with a user 504. Computing device 502 may be configured to execute, among other programs, a web browser application 508 and a browser extension application 506. System 500 may further include a browser extension server 510, a financial service provider (FSP) system 512, and a merchant system 514. As shown, computing device 502, browser extension server 510, FSP system 512, and merchant system 514 may be communicatively coupled by a network 516. The functionality and benefits of browser extension server 510 may also be achieved via a browser extension server or module 511 within, or more directly associated with, at least one merchant system 514, for example. For simplicity of explanation, the behavior of one or both of such server 510 and/or module 511 are discussed below by reference to just the browser extension server, i.e., 510.

While only one computing device 502, browser extension server 510 (also module 511), FSP system 512, merchant system 514, and network 516 are shown, it will be understood that system 500 may include more than one of any of these components. More generally, the components and arrangement of the components included in system 500 may vary. Thus, system 500 may include other components that perform or assist in the performance of one or more processes consistent with the disclosed embodiments. Computing device 502 may be one or more computing devices configured to perform operations consistent with executing browser extension application 506 and with executing web browser application 508. Computing device 502 is further described below in connection with FIG. 7.

Browser extension application 506 may be one or more software applications configured to perform operations consistent with obtaining and processing purchase details on web pages, as disclosed herein. For example, browser extension application 506 may be configured to perform screen scraping functionality to determine purchase details associated with online purchases or transactions associated with the user 504 and/or computing device 502. Alternatively or additionally, browser extension application 506 may be configured to take screenshots of online purchases or transactions associated with the user 504 and/or computing device 502 and perform processing regarding the resulting image data to determine the purchase details. Such processing of image data may occur by or with the browser extension application 506, or the browser extension application 506 may transmit requests to and/or operate with one or more other software applications and/or computing components to determine the purchase details from the image data.

The disclosed systems, platforms, methods, and computer-readable media include or involve a software application with a browser extension configured to detect purchase transactions and/or unusual websites and to determine purchase details from online transactions completed via the browser. Unlike conventional software/browser extension applications, the disclosed technology utilizes an improved browser extension application that may, via specialized interactions with a web browser and/or dedicated portal associated with the user or a financial institution and/or a browser extension server, be configured to automatically detect unusual websites as well as automatically determine associated transactions and purchase details relevant to reducing subsequent false-positive incidents of fraud detection. In these and other manners, implementations involving the disclosed browser extension application represents an improvement over conventional web browser applications. The disclosed browser extension application improves utilization of both processing and communications resources via determining unusual websites as well as via detection and capture of needed purchase details as well as the reduction of computer resources and time (for the user) required to process fraud incidents that are false positives. Moreover, the improved automatic detection and handling enabled by the disclosed browser extension application improves efficiency of web transactions and fraud processing on the whole, thereby reducing or eliminating unnecessary and/or inefficient processor utilization and communications bandwidth consumption related to false-positive incidents that can be more effectively resolved, as disclosed herein.

Web browser application 508 may be one or more software applications configured to perform operations consistent with providing web pages to the user, such as web pages associated with merchants. The web pages may include transaction functionality including purchase details for goods or services that the user purchases via such web pages. Web browser application 508 is further described below in connection with FIG. 7.

Browser extension server 510 may be one or more computing devices configured to perform operations consistent with providing browser extension application 506. Browser extension server 510 may be further configured to perform operations consistent with processing online activities with merchants via the browser extension application 506 for detecting online transactions and determining purchase details for same. Browser extension server 510 is further described below in connection with FIG. 6.

FSP system 512 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

FSP system 512 may be one or more computing devices configured to perform operations consistent with servicing or maintaining financial service accounts, including a financial service account associated with user 504. FSP system 512 may be further configured to process financial transactions associated with such financial service accounts, including authenticating and performing fraud detection regarding such transactions. In particular, FSP system 512 may be configured to perform such processing of financial transactions associated with a financial service account associated with user 504. In some embodiments, FSP system 512 may be further configured to generate content for a display device included in, or connected to, computing device 502, such as through a desktop or mobile banking or other application on computing device 502. Alternatively or additionally, FSP system 512 may be configured to provide content through one or more web pages or online portals that are accessible by computing device 502 over network 516. The disclosed embodiments are not limited to any particular configuration of FSP system 512.

While browser extension server 510 and FSP system 512 are shown separately, in some embodiments browser extension server 510 may include or be otherwise related to FSP system 512. For example, in some embodiments the facility of browser extension server 510 may be provided instead by FSP system 512, or vice versa. Alternatively or additionally, in some embodiments, browser extension server 510 may be included in, and/or be otherwise related to, any other entity in system 500 and/or a third-party not shown in system 500. Alternatively or additionally, browser extension server 510 may be a standalone server. Browser extension server 510 may take other forms as well. Among other implementations, for example, the functionality and benefits of browser extension server 510 may also be achieved via a browser extension server or module 511 within, or more directly associated with, at least one merchant system 514.

Merchant system 514 may be one or more computing devices configured to perform operations consistent with providing web pages that are accessible by computing device 502 over network 516. For example, the web pages may be provided at computing device 502 through web browser application 508. In some embodiments, merchant system 514 may be associated with a merchant that provides goods or services. Further, in some embodiments, the web pages may be online retail web pages through which user 504 may engage in purchase transactions to purchase the merchant's goods or services. Other web pages are possible as well. The disclosed embodiments are not limited to any particular configuration of merchant system 514.

In some embodiments, merchant system 514 may include a merchant payment system 518. Merchant payment system 518 may be one or more computing devices configured to perform operations consistent with providing, within the web pages provided by merchant system 514, a merchant-provided payment process through which user 504 may engage in purchase transactions to purchase the merchant's goods or services. In some embodiments, merchant payment system 518 may be provided by the merchant in connection with one or more financial service providers, such as the financial service provider associated with FSP system 512 or another financial service provider. The payment process may, for example, be the same as or similar to MasterPass™, PayPal®, or Visa® Checkout. Other payment processes are possible as well.

Network 516 may be any type of network configured to provide communication between components of system 500. For example, network 516 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 500. In other embodiments, one or more components of system 500 may communicate directly through a dedicated communication link(s).

It is to be understood that the configuration and boundaries of the functional building blocks of system 500 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 6:
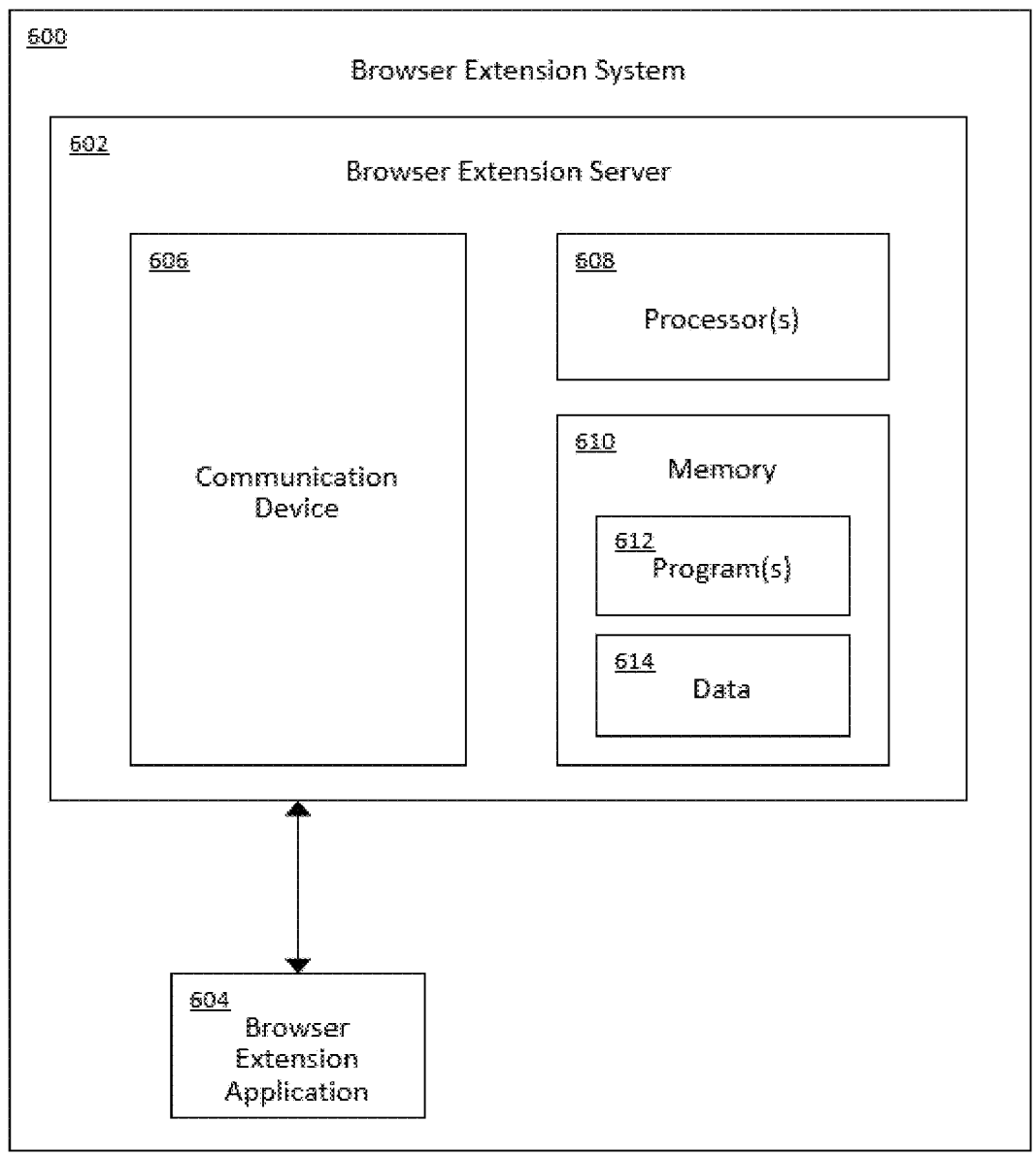
FIG. 6 is a block diagram of an exemplary system with browser extension server and application, consistent with exemplary aspects of at least some embodiments of the present disclosure.

FIG. 6 is a block diagram of an exemplary browser extension system 600, consistent with disclosed embodiments. As shown, browser extension system 600 may include browser extension server 602 and browser extension application 604. Browser extension server 602 may include a communication device 606, one or more processor(s) 608, and memory 610 including one or more programs 612 and data 614. Browser extension server 602 may be configured to perform operations consistent with providing browser extension application 604.

Browser extension server 602 may take the form of a server, general purpose computer, mainframe computer, or any combination of these components. Other implementations consistent with disclosed embodiments are possible as well. Browser extension application 604 may take the form of one or more software applications stored on a computing device, such as browser extension application 506 stored on computing device 502 described above.

Communication device 606 may be configured to communicate with one or more computing devices, such as computing device 502. In some embodiments, communication device 606 may be configured to communicate with the computing device(s) through browser extension application 604. Browser extension server 602 may, for example, be configured to provide instructions and/or operating information to browser extension application 604 through communication device 606. As another example, browser extension server 602 may be configured to receive from browser extension application 604 one or both of the UI image data and/or the purchase details through communication device 606. Communication device 606 may be configured to communicate other information as well.

Communication device 606 may be further configured to communicate with one or more FSP systems, such as FSP system 512 described above. In some embodiments, the FSP system may provide a financial service account associated with a computing device, and communication device 606 may be configured to communicate with the FSP system(s) to generate, transmit and/or process security-related information or instructions regarding the financial service account associated with the computing device. Communication device 606 may be configured to communicate with the FSP system(s) in other manners. Communication device 606 may be configured to communicate with other components as well.

Processor(s) 608 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. S1, . . . processors) family manufactured by Apple™, or any of various processors manufactured by Sun Microsystems, for example. The disclosed embodiments are not limited to any type of processor(s) otherwise configured to meet the computing demands required of different components of browser extension system 600.

Memory 610 may include one or more storage devices configured to store instructions used by processor(s) 608 to perform functions related to disclosed embodiments. For example, memory 610 may be configured with one or more software instructions, such as program(s) 612, that may perform one or more operations when executed by processor(s) 608. The disclosed embodiments are not limited to separate programs or computers configured to perform dedicated tasks. For example, memory 610 may include a single program 612 that performs the functions of browser extension system 600, or program(s) 612 may comprise multiple programs. Memory 610 may also store data 614 that is used by program(s) 612.

In certain embodiments, memory 610 may store sets of instructions for carrying out the processes described below in connection with FIG. 8. Other instructions are possible as well. In general, instructions may be executed by processor(s) 608 to perform one or more processes consistent with disclosed embodiments. In some embodiments, program(s) 612 may include one or more subcomponents configured to generate and/or process instructions and information for use by browser extension application 604 in detecting unusual transactions and/or performing other fraud-related transaction processing.

The components of browser extension system 600 may be implemented in hardware, software, or a combination of both hardware and software, as will be apparent to those skilled in the art. For example, although one or more components of browser extension system 600 may be implemented as computer processing instructions, all or a portion of the functionality of browser extension system 600 may be implemented instead in dedicated electronics hardware. In some embodiments, browser extension system 600 may also be communicatively connected to one or more database(s) (not shown). Alternatively, such database(s) may be located remotely from browser extension system 600. Browser extension system 600 may be communicatively connected to such database(s) through a network, such as network 516 described above. Such database(s) may include one or more memory devices that store information and are accessed and/or managed through browser extension system 600. In some embodiments, one or both of processing online transactions and the disclosed browser extension functionality may be implemented with, or by involving, such database(s). By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data from the database(s).

Figure 7:
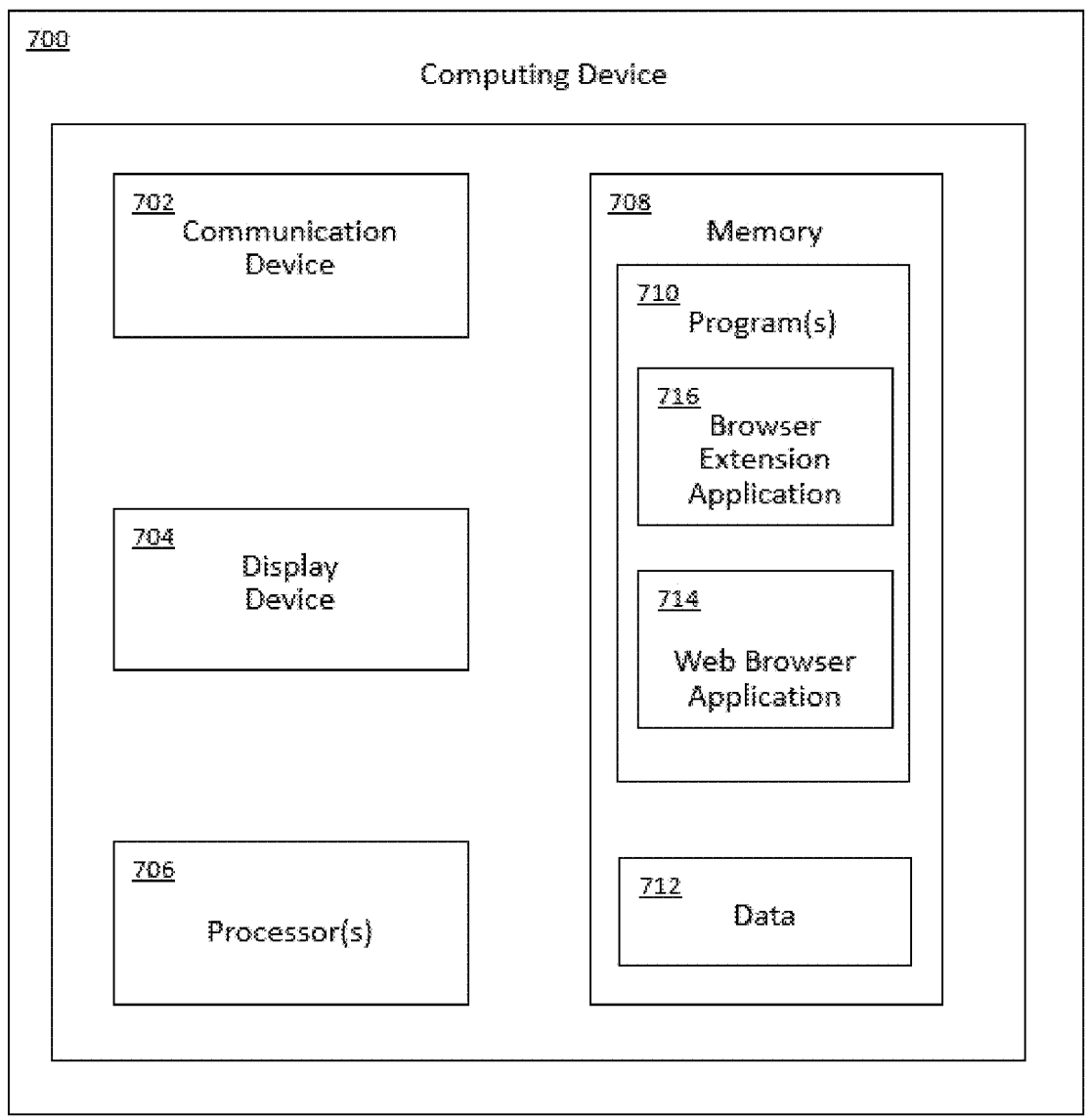
FIG. 7 is a block diagram of an exemplary computing device that may be associated with false-positive incident detection/prevention, consistent with exemplary aspects of at least some embodiments of the present disclosure.

FIG. 7 is a block diagram of an exemplary computing device 700, consistent with disclosed embodiments. As shown, computing device 700 may include communication device 702, display device 704, processor(s) 706, and memory 708 including program(s) 710 and data 712. Program(s) 710 may include, among others, web browser application 714 and browser extension application 716. In some embodiments, computing device 700 may take the form of a desktop or mobile computing device, such as a desktop computer, laptop computer, smartphone, tablet, or any combination of these components. Alternatively, computing device 700 may be configured as any wearable item, including jewelry, smart glasses, or any other device suitable for carrying or wearing on a user's person. Other implementations consistent with disclosed embodiments are possible as well. Computing device 700 may, for example, be the same as or similar to computing device 502 described above.

In the example embodiment shown, communication device 702 may be configured to communicate with a browser extension server, such as browser extension servers 510 and 602 described above. In some embodiments, communication device 702 may be further configured to communicate with one or more merchant systems, such as merchant system 514 described above, and/or one or more FSP systems, such as FSP system 512 described above. Communication device 702 may be configured to communicate with other components as well. Communication device 702 may be configured to provide communication over a network, such as network 516 described above. To this end, communication device 702 may include, for example, one or more digital and/or analog devices that allow computing device 700 to communicate with and/or detect other components, such as a network controller and/or wireless adaptor for communicating over the Internet. Other implementations consistent with disclosed embodiments are possible as well.

Display device 704 may be any display device configured to display interfaces on computing device 700. The interfaces may include, for example, web pages provided by computing device 700 through web browser application 516.

In some embodiments, display device 704 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 704 may also include one or more digital and/or analog devices that allow a user to interact with computing device 700, such as a touch-sensitive area, keyboard, buttons, or microphones. Other display devices are possible as well. The disclosed embodiments are not limited to any type of display devices otherwise configured to display interfaces.

Processor(s) 706 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 706 may also include various architectures (e.g., x86 processor, ARM®, etc.). The disclosed embodiments are not limited to any type of processor(s) otherwise configured to meet the computing demands required of different components of computing device 700.

Memory 708 may include one or more storage devices configured to store instructions used by processor(s) 706 to perform functions related to disclosed embodiments. For example, memory 708 may be configured with one or more software instructions, such as program(s) 710, that may perform one or more operations when executed by processor(s) 706. The disclosed embodiments are not limited to separate programs or computers configured to perform dedicated tasks. For example, memory 708 may include a single program 710 that performs the functions of computing device 700, or program(s) 710 may comprise multiple programs. Memory 708 may also store data 712 that is used by program(s) 710. In certain embodiments, memory 708 may store sets of instructions for carrying out the processes described below in connection with FIG. 8. Other instructions are possible as well. In general, instructions may be executed by processor(s) 706 to perform one or more processes consistent with disclosed embodiments.

In some embodiments, program(s) 710 may include a web browser application 714. Web browser application 714 may be executable by processor(s) 706 to perform operations including, for example, providing web pages for display. The web pages may be provided, for example, via display device 704. In some embodiments, the web pages may be associated with a merchant system, such as merchant system 514 described above. Web browser application 714 may be executable by processor(s) 706 to perform other operations as well. In some embodiments, program(s) 710 may further include a browser extension application 716. Browser extension application 716 may, for example, be the same as similar to browser extension applications 506 and 604 described above. Browser extension application 716 may be executable by processor(s) 706 to perform various operations including, for example, detecting and automatically populating transaction fields in web pages provided by computing device 700 through web browser application 714. Other instructions are possible as well. In general, instructions may be executed by processor(s) 706 to perform one or more processes consistent with disclosed embodiments.

The components of computing device 700 may be implemented in hardware, software, or a combination of both hardware and software, as will be apparent to those skilled in the art. For example, although one or more components of computing device 700 may be implemented as computer processing instructions, all or a portion of the functionality of computing device 700 may be implemented instead in dedicated electronics hardware.

Figure 8:
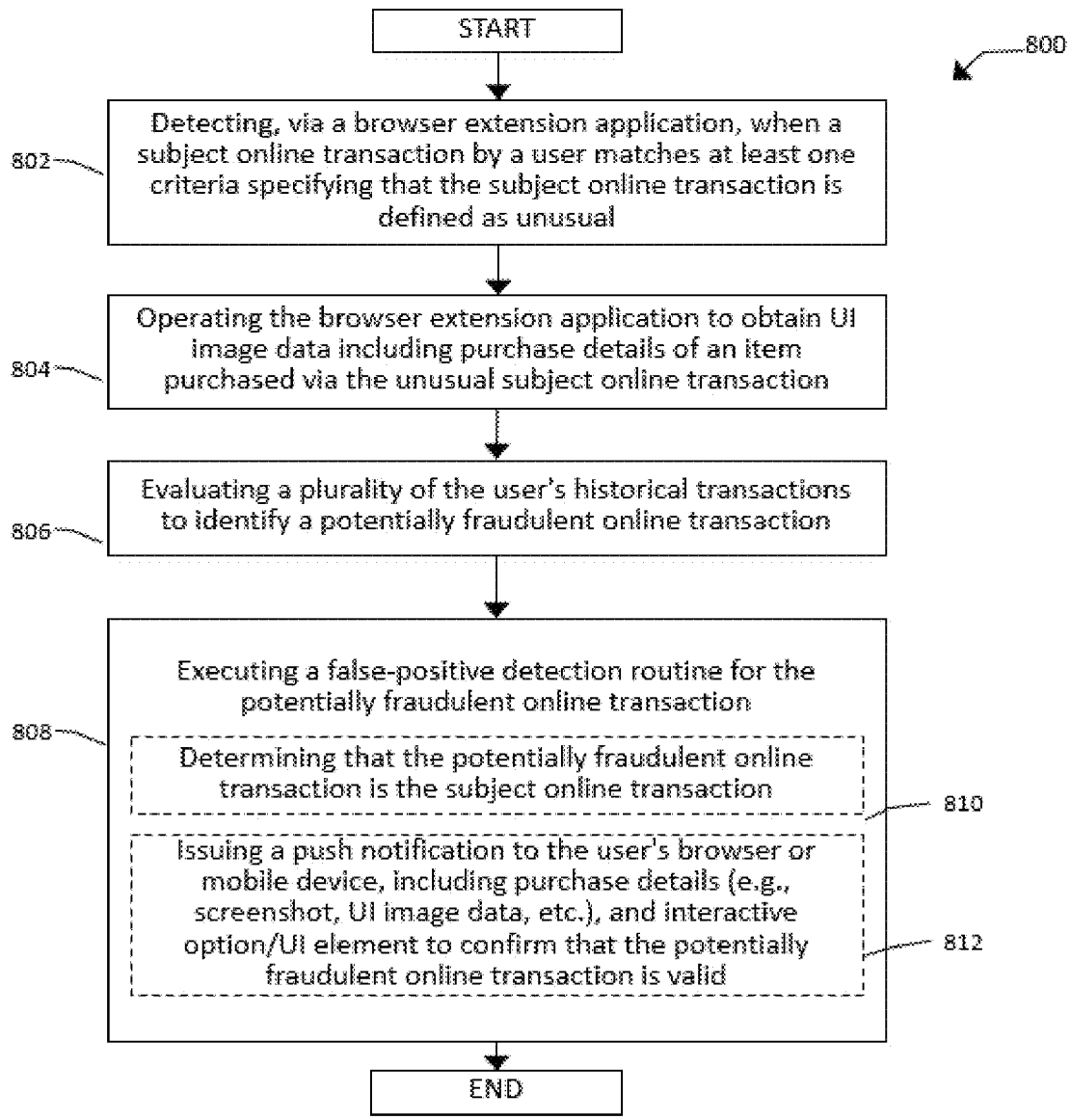
FIG. 8 is a flowchart illustrating one exemplary false-positive incident detection/prevention process, consistent with exemplary aspects of at least some embodiments of the present disclosure.

FIG. 8 is a flowchart illustrating one exemplary transaction handling process 800 for processing transactions that may be fraudulent, consistent with one or more aspects of various embodiments of the present disclosure. Transaction handling process 800 may be carried out via browser extension functionality, e.g. performed by browser extension servers 510 and 602 described above, in connection with a browser extension application, such as browser extension applications 506, 604, and 716 described above. In some embodiments, transaction handling process 800 may include, at step 802, detecting, via a browser extension application, when a subject (current) online transaction by a user matches at least one criteria specifying that the subject online transaction is defined as unusual. With regard to the disclosed innovations, the subject online transaction may be designated as unusual if it is determined to be unusual by a software application monitoring the transaction, such as an application associated with one or more of the merchant system 514, the computing device 502 and/or web browser application 508 of the user 104, the browser extension system 600, the browser extension server 510, 602, and/or the computing device 700. The subject online transaction may be deemed unusual based on one or more of an amount of the transaction (e.g., an unusually high amount, etc.), a location of the transaction, the merchant(s), intermediaries and/or related entities involved, information regarding the goods or services purchased, information associated with a Merchant Classification Code (MCC) of the merchant, and one or more patterns associated with the transaction, among other factors. By way of example and not limitation, a transaction may be deemed unusual based on (i) a geographic location of the merchant; (ii) information derived from the merchant classification code (MCC) of the merchant; (iii) detecting whether a transaction is over a threshold value; (iv) detecting whether a merchant associated with the subject online transaction is unknown or known (e.g., in a database of merchants, on a list of approved merchants, etc.); and/or (v) detecting whether the merchant or the subject online transaction is unusual based on presence or absence of a pattern. The pattern or patterns that may be utilized to classify a transaction as unusual may include difference(s) from expected transactions and/or previous purchases or transaction behaviors of the user, such as day of week, time of day, and similar metrics that would be associated with an expected transaction at that merchant (e.g., business hours at a brick and mortar location, etc.) and/or previous or expected transaction behavior of the user (e.g., timing related to a transaction, such as whether it falls outside of the time range that contains most of the customer's transactions, etc.). Further, the processing performed to determine whether such transactions are unusual may also include and/or involve an evaluation process (performed presently, or previously) regarding the user's historical transactions. Addition mechanisms for flagging transactions as unusual, as known in the art, e.g., in fields such as existing fraud detection technologies, may also be used.

The transaction handling process 800 may include, at step 804, operating the browser extension application to obtain UI image data including purchase details of an item purchased via the unusual subject online transaction. An illustration of a user interface of one such browser extension application is shown and discussed in connection with FIG. 9, below. The present browser extension applications, as well as other implementations herein (e.g., mobile app, etc.), may utilize several techniques to obtain the UI image data and purchase details. Further, in some implementations, the image data and particularly the purchase details may be acquired in real-time. In a first exemplary embodiment, such technique may comprise performing screen scraping of web pages displayed during the subject online transaction to obtain the purchase details via the browser extension application. These web pages may be provided by the computing device through a web browser application, such as web browser applications 508 and 714 described above. Screen scraping may include detecting transaction fields, which may involve, for example, detecting patterns within the HTML or XML used to create the web page. Transaction fields may be detected in other manners as well. In processing such web pages as well as the associated information and fields, the browser extension application may look for key data types and values, such as shopping cart data, purchase items, transaction or purchase amounts, dates (e.g., delivery date, etc.), other numerical information (e.g., customer credit card or account numbers, etc.), and the like. Further, the browser extension application may be programmed to immediately scrape and store such purchase details with the images of the associated web pages. Such browser extension application functionality, here and below, may be executed, for example, by browser extension applications 506, 604, and 716 described above. These browser extension applications may also be executed via one or more computing devices, such as computing devices 502 and 700 described above and/or other computing devices.

In another exemplary embodiment, a process of obtaining UI image data may comprise acquiring one or more screenshots of Web pages displayed during the subject online transaction, and then subsequently process the one or more screenshots, e.g. using image recognition, to determine such purchase details. In some embodiments, the browser extension application itself may process the one or more screenshots using image recognition to determine the purchase details. In other embodiments, one or more other software applications, computers and/or processors may perform such image recognition, separately or in connection with the browser extension application.

In various embodiments, transaction handling process 800 may include, at step 806, evaluating a plurality of the user's historical transactions to identify a potentially fraudulent online transaction. This step may comprise traditional techniques for initially flagging one or more transactions of a user as potentially fraudulent. In existing systems, such a step is conventionally followed by various time-consuming and/or computer processor intensive operations related to advising the user of the potentially fraudulent transaction and verifying, in ways that typically entail manual interactions, that the subject transaction was valid (that is, the potential fraud warning was unnecessary, i.e., a false positive) to thereby authorize and complete the transaction.

In some embodiments, the transaction handling process 800 may include, at step 808, executing a false-positive detection routine regarding the potentially fraudulent online transaction. Such a false-positive detection routine may comprise, at 810, determining that the potentially fraudulent online transaction is the subject online transaction. Here, for example, embodiments of the disclosed technology may make an initial determination to establish whether each potentially fraudulent transaction flagged for processing corresponds to a subject online transaction that was determined to be unusual, i.e., for which the UI image data and purchase details were acquired. Further, once such correspondence has been established, a push notification may be issued to the user's browser, mobile device, or other network-connected device, e.g., at 812. As explained further, below, such push notification may include the purchase details, such as a screenshot, UI image data or the like acquired when the transaction took place, as well as one or more interactive options, UI elements, fields, and/or prompts enabling the user to confirm that the transactional flagged as potentially fraudulent was valid, as evidenced by the purchase details that the user is able to view via the push notification.

In some embodiments, a browser extension application executed at the computing device may be configured to process and/or capture transactions executed in connection with merchant-based online offerings. In some embodiments, for example, the browser extension application may process communications and transactions associated with such merchants and detect various transaction information and fields, as set forth above. For example, the browser extension application may detect evidence of an online purchase or transaction as well as purchase details associated with such purchase or transaction. In some embodiments, the browser extension application may provide, to the browser extension server, information regarding such purchases or transactions and/or their associated purchase details. Alternatively or additionally, in some embodiments the browser extension application may provide to the browser extension server all or part of the web pages or web communication(s) associated with such transaction, e.g., in the original programming language. In some embodiments, the browser extension server may determine the purchase details based, at least in part, on the information regarding the transaction (i.e., the purchases/transactions and purchase details) and/or the programming language received and analyzed.

According to some embodiments, various communications and functionality may be generated via the browser extension system 600, such as by the browser extension application 604 and/or the browser extension server 602. For example, the browser extension server may generate web pages and/or associated programming language to provide web pages, including web pages having interactive UI elements. In certain implementations, the interactive UI elements in such web pages may include a prompt or field enabling the user to confirm whether a potential fraud incident is a valid transaction. In one or more further embodiments, the web pages being generated may also include one or more additional options or UI elements detectable by the web page that enable the user to provide additional feedback regarding the potential fraud incident.

In other embodiments, the browser extension system 600 and/or its' browser extension application 604 may be responsible for generating instructions for an SMS message to be sent to the user regarding the potential fraud incident. Here, for example, such SMS message may include the UI image data of the screen at which the transaction took place and prompting the user in a manner to which the user can respond to confirm whether a potential fraud incident is a valid transaction. Further, such SMS messages may also include one or more additional options, such as text prompts or requests for certain replies by text or SMS, enabling the user to provide additional feedback regarding the potential fraud incident.

Figure 9:
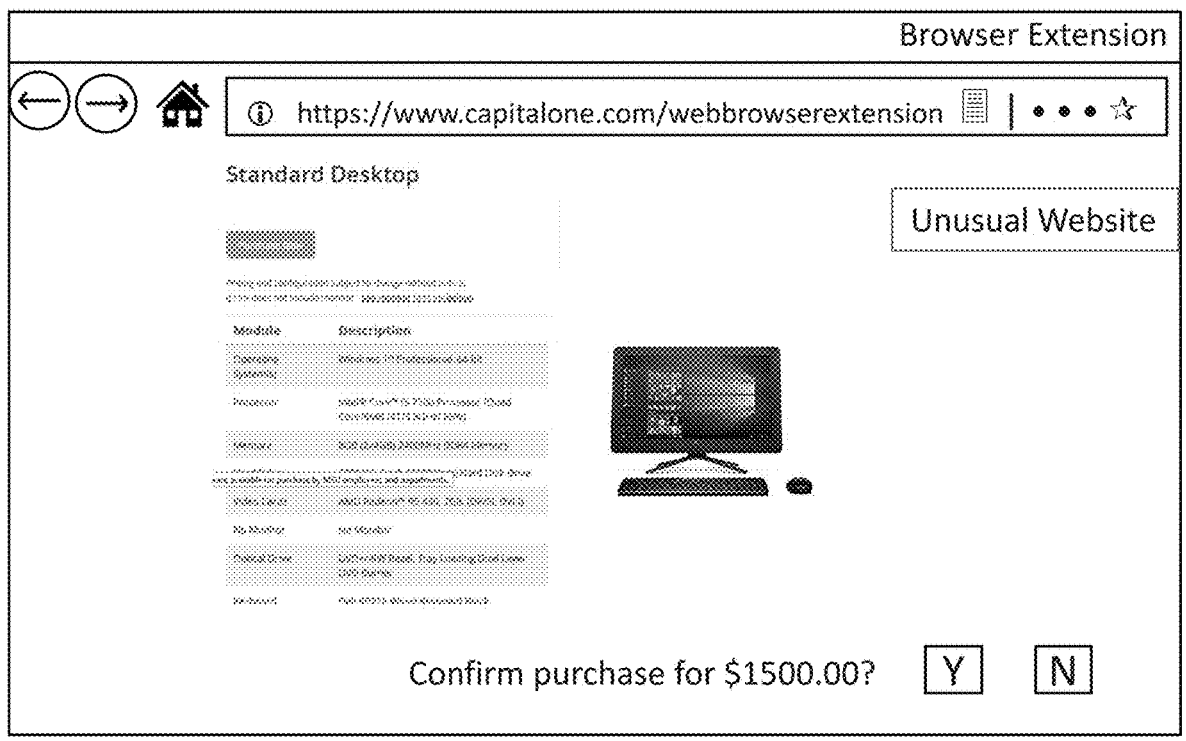
FIG. 9 is a diagram of a user interface illustrating exemplary aspects of a browser extension, consistent with exemplary aspects of at least some embodiments of the present disclosure.

FIG. 9 is a diagram of a user interface illustrating exemplary aspects of a browser extension, consistent with exemplary aspects of at least some embodiments of the present disclosure. Referring to FIG. 9, a representative user interface illustrating a browser extension application obtaining UI image data and purchase details of an item purchased via the unusual online transaction 804. As discussed above, once this UI image data is obtained, several techniques may be utilized to obtain the purchase details from the UI image data, such as screen scraping performed by the browser extension application in association with capture as well as subsequently processing screenshots such as by image recognition to determine the purchase details, among others.

Figure 10:
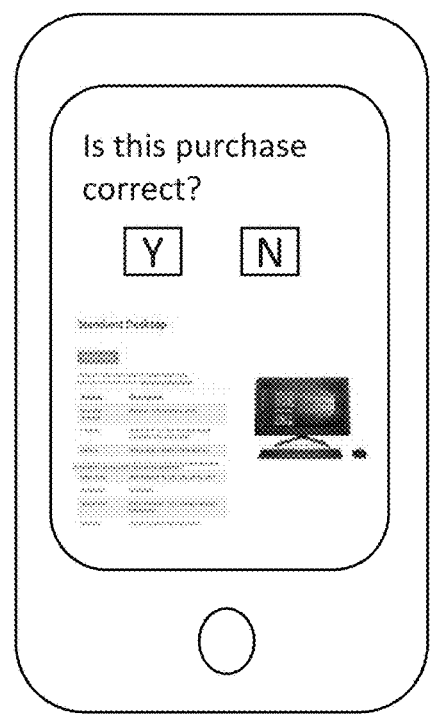
FIG. 10 is a diagram illustrating an exemplary interface and message on a mobile device, consistent with exemplary aspects of at least some embodiments of the present disclosure.

FIG. 10 is a diagram illustrating an exemplary interface and push notification, such as a text or SMS message, on a mobile device, consistent with exemplary aspects of at least some embodiments of the present disclosure. As described in more detail, above, such push notifications may include the purchase details, such as a screenshot, UI image data or the like acquired when the transaction took place, as well as one or more interactive options, UI elements, fields, and/or prompts enabling the user to confirm that the transactional flagged as potentially fraudulent was valid, e.g., as the user may thus be able to confirm based on the purchase details that the user is able to view via the push notification.

At least some aspects of the present disclosure will now be described with reference to the following numbered clauses.

1. A computer-implemented method, such as a method for proactively reducing false-positive fraud detection incidents, the method comprising:

detecting, via a browser extension application, when a current online transaction by a user matches at least one criteria specifying that the current online transaction is defined as unusual;

operating the browser extension application, during the unusual current online transaction and before completion thereof, to obtain UI image data including purchase details of an item purchased via the unusual current online transaction;

evaluating a plurality of the user's historical transactions to identify a potentially fraudulent online transaction; and executing a false-positive detection routine for the potentially fraudulent online transaction, the detection routine comprising:

determining that the potentially fraudulent online transaction is the current online transaction based on the UI image data; and issuing a push notification to the user's browser or mobile device, the push notification comprising: (i) a screenshot from the UI image data and (ii) a prompt or UI element enabling the user to confirm whether the potentially fraudulent online transaction is a valid online transaction.

2. The method of claim 1 or the invention of any claim herein, wherein the criteria indicating that the current online transaction is unusual include assessment regarding one or more of: (i) a geographic location of the merchant; (ii) a merchant classification code (MCC) of the merchant; (iii) detecting whether a transaction is over a threshold value; (iv) detecting whether a merchant associated with the current online transaction is unknown or known (e.g., in a database of merchants, on a list of approved merchants, etc.); and/or (v) detecting whether the merchant or the current online transaction is unusual based on presence or absence of a pattern.

3. The method of claim 1 or the invention of any claim herein, further comprising performing, via the browser extension application, screen scraping of Web pages displayed during the current online transaction to obtain the purchase details by the browser extension application.

4. The method of claim 3 or the invention of any claim herein, wherein the browser extension application obtains the purchase details in real time.

5. The method of claim 1 or the invention of any claim herein, wherein obtaining the UI image data includes taking, via the browser extension application, one or more screenshots of Web pages displayed during the current online transaction;

the method further comprising:

processing the one or more screenshots using image recognition to determine the purchase details.

6. The method of claim 5 or the invention of any claim herein, wherein the browser extension application processes the one or more screenshots using image recognition to determine the purchase details.

7. The method of claim 1 or the invention of any claim herein, further comprising receiving, from the browser extension application, programming language providing a Web page with an interactive UI element including a prompt or field enabling the user to confirm whether a potential fraud incident is a valid transaction.

8. The method of claim 7 or the invention of any claim herein, wherein the Web page further includes one or more additional options or elements detectable by the Web page enabling the user to provide additional feedback regarding the potential fraud incident.

9. The method of claim 1 or the invention of any claim herein, further comprising receiving, from the browser extension application, an SMS message to which the user can respond to confirm whether a potential fraud incident is a valid transaction.

10. The method of claim 9 or the invention of any claim herein, wherein the SMS message further includes one or more additional options enabling the user to provide additional feedback regarding the potential fraud incident.

11. At least one non-transitory computer-readable media storing instructions that, when executed by at least one processor, cause the at least one processor to operate a computer system for proactively reducing false-positive fraud detection incidents by performing operations, the operations comprising:

logging a user into a Web browser application that includes a browser extension application that monitors online transactions of the user;

detecting, via the browser extension application, when a current online transaction by the user matches at least one criteria specifying that the current online transaction is defined as unusual;

operating the browser extension application, during the unusual current online transaction, to obtain UI image data including purchase details of an item purchased via the unusual current online transaction;

evaluating a plurality of the user's historical transactions to identify a potentially fraudulent online transaction; and executing a false-positive detection routine for the potentially fraudulent online transaction, the detection routine comprising:

determining that the potentially fraudulent online transaction is the current online transaction based on the UI image data; and issuing a push notification to the user's browser or mobile device, the push notification comprising: (i) a screenshot from the UI image data and (ii) a prompt or UI element enabling the user to confirm whether the potentially fraudulent online transaction is a valid online transaction.

12. The computer-readable media of claim 11 or the invention of any claim herein, wherein the criteria indicating that the current online transaction is unusual include assessment regarding one or more of: (i) a geographic location of the merchant; (ii) a merchant classification code (MCC) of the merchant; (iii) detecting whether a transaction is over a threshold value; (iv) detecting whether a merchant associated with the current online transaction is unknown or known (e.g., in a database of merchants, on a list of approved merchants, etc.); and/or (v) detecting whether the merchant or the current online transaction is unusual based on presence or absence of a pattern.

13. The computer-readable media of claim 11 or the invention of any claim herein, the operations further comprising performing, via the browser extension application, screen scraping of Web pages displayed during the current online transaction to obtain the purchase details by the browser extension application.

14. The computer-readable media of claim 13 or the invention of any claim herein, wherein the browser extension application obtains the purchase details in real time.

15. The computer-readable media of claim 11 or the invention of any claim herein, wherein obtaining the UI image data includes taking, via the browser extension application, one or more screenshots of Web pages displayed during the current online transaction;
the method further comprising:
processing the one or more screenshots using image recognition to determine the purchase details.

16. The computer-readable media of claim 15 or the invention of any claim herein, wherein the browser extension application processes the one or more screenshots using image recognition to determine the purchase details.

17. The computer-readable media of claim 11 or the invention of any claim herein, the operations further comprising receiving, from the browser extension application, programming language providing a Web page with an interactive UI element including a prompt or field enabling the user to confirm whether a potential fraud incident is a valid transaction.

18. The computer-readable media of claim 11 or the invention of any claim herein, the operations further comprising receiving, from the browser extension application, an SMS message to which the user can respond to confirm whether a potential fraud incident is a valid transaction.

19. The computer-readable media of claim 11 or the invention of any claim herein, wherein the push notification further includes one or more additional options enabling the user to provide additional feedback regarding a potential fraud incident.

20. A system comprising:
at least one processor;
at least one non-transitory computer-readable media, coupled to the at least one processor and storing instructions that, when executed by at least one processor, cause the at least one processor to operate a computer system for proactively reducing false-positive fraud detection incidents by performing operations, the operations comprising:
detecting, via a browser extension application, when an online transaction by a user matches at least one criteria specifying that the online transaction is defined as unusual;
operating the browser extension application, during the online transaction and before completion thereof, to obtain UI image data including purchase details of an item purchased via the transaction;
processing a plurality of the user's purchase transactions for possible fraud and issuing fraud alerts for any transactions determined to be potentially fraudulent;
executing a false-positive detection routine for at least one transaction determined to be potentially fraudulent, the detection routine comprising:
verifying, for the at least one transaction, that the UI image data and the purchase details were obtained, via the browser extension application, to enable verification of the transaction; and
issuing a push notification to the user's browser or mobile device, the push notification comprising a screenshot from the UI image data depicting the purchase details and a prompt or UI element enabling the user to confirm whether the fraud alert was a valid online transaction.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method for proactively reducing false-positive fraud detection incidents, the method comprising:
implementing, by at least one processor, a browser extension application with a Web browser application installed on a computer device associated with a user, wherein the browser extension application is configured to monitor online transactions of the user;
detecting, by the at least one processor, via the browser extension application, that a current online transaction of the user matches at least one criteria specifying that the current online transaction is defined as an unusual current online transaction;
utilizing, by the at least one processor, the browser extension application, during the unusual current online transaction and before completion thereof, to perform screen scraping of Web Pages displayed during the current online transaction to obtain, in real time, UI image data including purchase details of an item to be purchased via the unusual current online transaction;
evaluating, by the at least one processor, a plurality of the user's historical transactions to identify a potentially fraudulent online transaction; and
executing, in association with the browser extension application, a false-positive detection routine for the potentially fraudulent online transaction, the detection routine comprising:
determining that the potentially fraudulent online transaction is the current online transaction based on the UI image data retrieved from the browser extension application; and
issuing, via the browser extension application, a push notification to the user's browser or mobile device, the push notification comprising: (i) a screenshot from the UI image data retrieved from the browser extension application and (ii) a prompt or UI element enabling the user to confirm whether the potentially fraudulent online transaction is a valid online transaction;

receiving, at the at least one processor, a reply to the push notification based on user-selection of the prompt or UI element confirming that the potentially fraudulent online transaction is valid; and characterizing, by the at least one processor, based on the reply to the push notification indicating that the potentially fraudulent online transaction is valid, the potentially fraudulent online transaction as a false-positive incident.

2. The method of claim 1 wherein the criteria indicating that the current online transaction is unusual include assessment regarding one or more of: (i) a geographic location of the merchant; (ii) a merchant classification code (MCC) of the merchant; (iii) detecting whether a transaction is over a threshold value; (iv) detecting whether a merchant associated with the current online transaction is unknown or known; and/or (v) detecting whether the merchant or the current online transaction is unusual based on presence or absence of a pattern.

3. The method of claim 1 wherein obtaining the UI image data includes taking, via the browser extension application, one or more screenshots of Web pages displayed during the current online transaction;

the method further comprising:
processing the one or more screenshots using image recognition to determine the purchase details.

4. The method of claim 3 wherein the browser extension application processes the one or more screenshots using image recognition to determine the purchase details.

5. The method of claim 4 further comprising receiving, from the browser extension application, an SMS message to which the user can respond to confirm whether a potential fraud incident is a valid transaction.

6. The method of claim 5 wherein the SMS message further includes one or more additional options enabling the user to provide additional feedback regarding the potential fraud incident.

7. The method of claim 1, further comprising receiving, from the browser extension application, programming language providing a Web page with an interactive UI element including a prompt or field enabling the user to confirm whether a potential fraud incident is a valid transaction.

8. The method of claim 7 wherein the Web page further includes one or more additional options or elements detectable by the Web page enabling the user to provide additional feedback regarding the potential fraud incident.

9. The method of claim 1, wherein the browser extension application is configured to analyze web pages associated with the current online transaction in an original programming language of the web pages.

10. The method of claim 1, wherein the browser extension application is configured to detect and transmit, to the at least one processor, web pages associated with the current online transaction based on or while maintaining original programming language of the web pages.

11. At least one non-transitory computer-readable media storing instructions that, when executed by at least one processor, cause the at least one processor to operate a computer system for proactively reducing false-positive fraud detection incidents by performing operations, the operations comprising:

implementing, by the at least one processor, a browser extension application with a Web browser application installed on a computing device associated with the user, wherein the browser extension application is configured to monitor online transactions of the user;

logging the user into the Web browser application;

detecting, by the at least one processor, via the browser extension application, that a current online transaction of the user matches at least one criteria specifying that the current online transaction is defined as an unusual current online transaction;

utilizing, by the at least one processor, the browser extension application, during the unusual current online transaction and before completion thereof, to perform screen scraping of Web Pages displayed during the current online transaction to obtain, in real time, UI image data including purchase details of an item to be purchased via the unusual current online transaction;

evaluating a plurality of the user's historical transactions to identify a potentially fraudulent online transaction; and executing, in association with the browser extension application, a false-positive detection routine for the potentially fraudulent online transaction, the detection routine comprising:

determining that the potentially fraudulent online transaction is the current online transaction based on the UI image data retrieved from the browser extension application; and issuing, via the browser extension application, a push notification to the user's browser or mobile device, the push notification comprising: (i) a screenshot from the UI image data retrieved from the browser extension application and (ii) a prompt or UI element enabling the user to confirm whether the potentially fraudulent online transaction is a valid online transaction;

receiving a reply to the push notification based on user-selection of the prompt or UI element confirming that the potentially fraudulent online transaction is valid; and determining, based on the reply to the push notification indicating that the potentially fraudulent online transaction is valid, that the potentially fraudulent online transaction is a false-positive incident.

12. The computer-readable media of claim 11 wherein the criteria indicating that the current online transaction is unusual include assessment regarding one or more of: (i) a geographic location of the merchant; (ii) a merchant classification code (MCC) of the merchant; (iii) detecting whether a transaction is over a threshold value; (iv) detecting whether a merchant associated with the current online transaction is unknown or known; and/or (v) detecting whether the merchant or the current online transaction is unusual based on presence or absence of a pattern.

13. The computer-readable media of claim 11, wherein obtaining the UI image data includes taking, via the browser extension application, one or more screenshots of Web pages displayed during the current online transaction;

the method further comprising:
processing the one or more screenshots using image recognition to determine the purchase details.

14. The computer-readable media of claim 13 wherein the browser extension application processes the one or more screenshots using image recognition to determine the purchase details.

15. The computer-readable media of claim 11, the operations further comprising receiving, from the browser extension application, programming language providing a Web page with an interactive UI element including a prompt or field enabling the user to confirm whether a potential fraud incident is a valid transaction.

16. The computer-readable media of claim 15, the operations further comprising receiving, from the browser extension application, an SMS message to which the user can respond to confirm whether a potential fraud incident is a valid transaction.

17. The computer-readable media of claim 16 wherein the push notification further includes one or more additional options enabling the user to provide additional feedback regarding a potential fraud incident.

18. A system comprising:
 at least one processor;
 at least one non-transitory computer-readable media, coupled to the at least one processor and storing instructions that, when executed by at least one processor, cause the at least one processor to operate a computer system for proactively reducing false-positive fraud detection incidents by performing operations, the operations comprising:
 implementing, by at least one processor, a browser extension application with a Web browser application installed on a computing device associated with the user, wherein the browser extension application is configured to monitor online transactions of the user;
 detecting, by at least one processor, via the browser extension application, that an online transaction of the user matches at least one criteria specifying that the online transaction is defined as an unusual current online transaction;
 utilizing, by the at least one processor, the browser extension application, during the unusual current online transaction and before completion thereof, to perform screen scraping of Web Pages displayed during the unusual current online transaction to obtain, in real time, UI image data including purchase details of an item to be purchased via the unusual current online transaction;
 processing a plurality of the user's purchase transactions for possible fraud and issuing fraud alerts for any transactions determined to be potentially fraudulent;
 executing, in association with the browser extension application, a false-positive detection routine for at least one transaction determined to be potentially fraudulent, the detection routine comprising:
  verifying, for the at least one transaction, that the UI image data retrieved from the browser extension application and the purchase details were obtained, via the browser extension application, to enable verification of the potentially fraudulent online transaction; and
  issuing, via the browser extension application, a push notification to the user's browser or mobile device, the push notification comprising a screenshot from the UI image data depicting the purchase details and retrieved from the browser extension application and a prompt or UI element enabling the user to confirm whether the fraud alert relates to a valid online transaction;
  receiving, at the at least one processor, a reply to the push notification based on user-selection of the prompt or UI element confirming that the potentially fraudulent online transaction is valid; and
  determining, based on the reply to the push notification indicating that the potentially fraudulent online transaction is valid, that the fraud alert is a false-positive incident.

19. The system of claim 18 wherein obtaining the UI image data includes taking, via the browser extension application, one or more screenshots of Web pages displayed during the current online transaction;
 the operations further comprising:
  processing the one or more screenshots using image recognition to determine the purchase details.

20. The system of claim 19 wherein the browser extension application processes the one or more screenshots using image recognition to determine the purchase details.

21. The system of claim 18, wherein the push notification comprises generating, via the browser extension application, programming language providing a Web page with an interactive UI element including a prompt or field enabling the user to confirm whether a potential fraud incident is a valid transaction.

22. The system of claim 21 wherein the Web page further includes one or more additional options or elements detectable by the Web page enabling the user to provide additional feedback regarding the potential fraud incident.

* * * * *